(12) United States Patent
Birrell

(10) Patent No.: US 7,977,602 B2
(45) Date of Patent: Jul. 12, 2011

(54) LASER ABLATION USING MULTIPLE WAVELENGTHS

(75) Inventor: Steven Edward Birrell, Bozeman, MT (US)

(73) Assignee: Photon Dynamics, Inc., San Jose, CA (US)

( * ) Notice: Subject to any disclaimer, the term of this patent is extended or adjusted under 35 U.S.C. 154(b) by 582 days.

(21) Appl. No.: 12/051,732

(22) Filed: Mar. 19, 2008

(65) Prior Publication Data
US 2008/0230525 A1    Sep. 25, 2008

Related U.S. Application Data

(60) Provisional application No. 60/896,228, filed on Mar. 21, 2007.

(51) Int. Cl.
*B23K 26/36* (2006.01)
(52) U.S. Cl. .......... 219/121.69; 219/121.77; 219/121.85
(58) Field of Classification Search ............. 219/121.68, 219/121.69, 121.76, 121.77, 121.85; 438/4, 438/795
See application file for complete search history.

(56) References Cited

U.S. PATENT DOCUMENTS

| | | | | |
|---|---|---|---|---|
| 3,710,798 A | * | 1/1973 | Bredemeier | 606/11 |
| 4,289,378 A | * | 9/1981 | Remy et al. | 359/368 |
| 4,408,602 A | * | 10/1983 | Nakajima | 606/10 |
| 4,476,154 A | * | 10/1984 | Iesaka et al. | 438/438 |
| 4,503,854 A | * | 3/1985 | Jako | 606/11 |
| 4,791,927 A | * | 12/1988 | Menger | 606/3 |
| 4,925,523 A | * | 5/1990 | Braren et al. | 216/66 |
| 5,009,658 A | * | 4/1991 | Damgaard-Iversen et al. | 606/2.5 |
| 5,304,167 A | * | 4/1994 | Freiberg | 606/3 |
| 5,482,561 A | * | 1/1996 | Yeung et al. | 134/1 |
| 5,611,946 A | * | 3/1997 | Leong et al. | 219/121.6 |
| 5,660,746 A | * | 8/1997 | Witanachchi et al. | 219/121.66 |
| 5,725,914 A | * | 3/1998 | Opower | 427/592 |
| 6,037,103 A | * | 3/2000 | Hino | 430/311 |
| 6,054,235 A | | 4/2000 | Bryan et al. | |
| 6,168,910 B1 | * | 1/2001 | Hino et al. | 430/328 |
| 6,512,198 B2 | * | 1/2003 | Eisele et al. | 219/121.71 |
| 6,563,083 B2 | * | 5/2003 | Behr et al. | 219/121.78 |
| 6,573,702 B2 | * | 6/2003 | Marcuse et al. | 324/756.03 |
| 6,689,985 B2 | * | 2/2004 | Lipman et al. | 219/121.7 |
| 6,972,268 B2 | * | 12/2005 | Ehrmann et al. | 438/795 |
| 2005/0029240 A1 | | 2/2005 | Dugan et al. | |
| 2005/0272179 A1 | * | 12/2005 | Frauenglass | 438/31 |
| 2006/0091125 A1 | | 5/2006 | Li et al. | |

FOREIGN PATENT DOCUMENTS

GB    2286787 A    *    8/1995

OTHER PUBLICATIONS

International Search Report and Written Opinion mailed Jul. 14, 2008 in PCT/US2008/057816 filed Mar. 21, 2008.

* cited by examiner

*Primary Examiner* — Samuel M Heinrich
(74) *Attorney, Agent, or Firm* — Kilpatrick Townsend and Stockton LLP; Ardeshir Tabibi

(57) ABSTRACT

In laser micromachining and laser defect repair of a first material, a first set of one or more laser wavelengths is selected in accordance with the first material's absorption characteristics and is combined and delivered concurrently with a second set of one or more laser wavelengths which is selected in accordance with the absorption characteristics of a second material generated by and remaining from the ablating interaction of the first material with the first set of laser wavelengths. The concurrent presence of the second set of one or more laser wavelengths removes the residual second material.

6 Claims, 5 Drawing Sheets

(PRIOR ART: Intense lasr beam)

(PRIOR ART: Directed sequential second laser beam)

(Invention)

LASER ABLATION USING MULTIPLE WAVELENGTHS

CROSS-REFERENCES TO RELATED APPLICATIONS

The present application claims benefit under 35 USC 119 (e) of U.S. provisional application No. 60/896,228, filed Mar. 21, 2007, entitled "Laser Ablation Using Multiple Wavelengths", the content of which is incorporated herein by reference in its entirety.

BACKGROUND OF THE INVENTION

The present invention relates generally to the non-contact repair of micro-circuits, and in particular to the repair of active matrix liquid crystal display panels.

During the manufacturing of liquid crystal (LC) displays, large clear plates of thin glass are used as a substrate for the deposition of thin film transistor (TFT) arrays. Usually, several independent TFT arrays are contained within one glass substrate plate and are often referred to as TFT panels. Alternatively, an active matrix LCD, or AMCLD, covers the class of displays utilizing a transistor or diode at every subpixel, and therefore encompasses TFT devices, such glass substrate plates may also be referred to as AMLCD panels. Flat panel displays may also be fabricated using any of the OLED technologies and though typically fabricated on glass, may also be fabricated on plastic substrate plates.

TFT pattern deposition is performed in a multitude of stages where in each stage, a particular material (such as a metal, indium tin oxide (ITO), crystalline silicon, amorphous silicon, etc.) is deposited on top of a previous layer (or glass) in conformity with a predetermined pattern. Each stage typically includes a number of steps such as deposition, masking, etching, stripping, etc.

During each of these stages and at various steps within each stage, many production defects may occur that may affect the electrical and/or optical performance of the final LCD product. Such defects include but are not limited to metal protrusion 110 into ITO 112, ITO protrusion 114 into metal 116, a so-called mouse bite 118, an open circuit 120, a short 122 in a transistor 124, and a foreign particle 126, as shown in FIG. 1. Other defects include mask problems, over or under etching, etc.

Even though the TFT deposition processes are tightly controlled, defect occurrence is unavoidable. This limits the product yield and adversely effects production costs. Typically, the TFT arrays are inspected using one or multiple Automated Optical Inspection (AOI) system(s) following critical deposition stages and by an electro-optical inspection machine, also referred to as array tester or array checker (AC) to test the finished TFT arrays. Commonly AOI and AC systems provide defect coordinates; they do not provide high resolution images required to classify defects as killer, reparable or just imperfections not affecting the TFT array performance (so called process defects). The defect coordinate information is passed to a TFT array repair tool, also referred to as array saver (AS), and such classification is conventionally done manually by the TFT array repair machine operator.

The average number of defects per plate may vary from one TFT array manufacturer to another and from one manufacturing plant to another. Typically, the defect review and repair capacity within the TFT array fabrication line is sized to process 300 to 400 defects per $7^{th}$ generation plates. Typically 5 to 10% of defects per plate may require repair.

Since the TFT array features are typically very small (sub-pixel size may be 80 micrometer by 240 micrometer and up to 216 micrometer by 648 micrometer for large 40 inch LCD televisions made from $7^{th}$ generation plates), the array repair tool includes a microscope to perform a defect review to decide whether the defect is repairable. The microscope field of view is small, ranging from 100 micrometer by 100 micrometer to 2 millimeter by 2 millimeter, relative to the plate size, which is typically 2.1 meter by 2.4 meter. The microscope is installed on a precision XY stage so that it can be dispatched from one defect to another. The defect coordinates are known from inspections carried out earlier by AOI and AC inspection systems. The glass plate remains immobilized under the XY stage by means of a vacuum chuck during the defect review and repair. Following the review, the repairable defects are typically treated by means of laser trimming, laser welding or by bridging open line.

The above series of general events is typical of all array repair tools. However, because the number, type, locations, size, degree of defects often vary from panel to panel, a means to pass judgment is required at almost all of the tool steps following capture of the defect images—for example, whether an image is truly a defect rather than nuisance, what kind of defect has been found, whether or not a specific defect needs repair, what kind of repair is required, what repair parameters are needed, what is the next defect to be repaired, and so forth. Many repair tools combine tool operation with human operator judgment and intervention to identify, classify, and then repair such defects.

FIG. 2 shows a defect repair example in cross section. Several typical layers are shown: a passivation layer 210 may cover the metal circuitry 212 and both lie on top of substrate 214. Metal protrusion defect 110 is shown in FIG. 2A (see FIG. 1 for top view). In this example, after identifying and classifying the defect 110, a repair recipe is created, and then executed to remove the protrusion using laser 220, as shown in FIG. 2B. Precision laser abalation or laser micro-machining requires matching the laser properties (wavelength, pulse-width, energy, etc.) to the material being removed. Material removal can be a relatively straightforward process, using typical laser cutting or ablation techniques in which first the most appropriate wavelength is selected followed by careful optimization of the laser energy and process.

However, in some cases the material to be removed does not abalate well and excessive debris is generated in the process. In other cases, a thin layer of one material needs to be cleanly removed without damaging an underlying layer which may respond differently to the laser wavelength due to having different optical properties. For such thin layers, the laser fluence (energy per area) must be uniform over the beam cross-section so as not to damage underlayers inadvertently because of "hot" spots within the beam cross-section, or to leave excess material because of having too little energy density. Multiple passes to clean up the debris are sometimes used, although often this leads to damage to the substrate or other layers underneath and longer tact times.

FIG. 3A shows a layer to be removed 310 on top of layer 312, which must not be damaged, both of which lie on substrate 314. FIG. 3B shows application of a laser beam 320 having wavelength λ1 to layer 310. FIG. 3C illustrates the results after attempting to ablate layer 310 with laser beam 320 at a fluence that does not damage underlayer 312. As shown, the material making up layer 310 may generate debris 330, which must be removed before continuing fabrication of the circuitry.

Ensuring that no debris remains may be addressed in several ways. One conventional method is to apply a higher fluence laser beam 320, as shown in FIG. 3D, so that no debris is generated, but this method increases the likelihood of damage to the underlayer 312, which may be partially ablated due to the higher fluence, as shown in FIG. 3E. Another prior art method allows generation of debris as in the steps illustrated by FIGS. 3A, 3B and 3C, but then introduces an additional step in which a laser of different wavelength λ2 322 is directed at the debris 330 (FIG. 3F). In this case, the debris 330 and the underlayer 312 may have similar optical properties, and therefore the underlayer may still be at risk for damage, since it will absorb λ2 as well (FIG. 3E). In the case in which the debris and underlayer have different optical properties, removal of the debris in a subsequent step using wavelength λ2 requires careful control of the laser fluence, since too high a fluence may still damage the underlayer, while too low a fluence may be insufficient to ablate the debris. Since debris may be of different size and volume, the laser fluence will need to be adjusted for each case. That is, the process window to achieve clean cuts without residual debris may be very narrow making automation of such a debris removal process difficult.

BRIEF SUMMARY OF THE INVENTION

In laser micromachining and laser defect repair of a first material, a first set of one or more laser wavelengths is selected in accordance with the first material's absorption characteristics and is combined and delivered concurrently with a second set of one or more laser wavelengths which is selected in accordance with the absorption characteristics of a second material generated by and remaining from the ablating interaction of the first material with the first set of laser wavelengths. The concurrent presence of the second set of one or more laser wavelengths removes the residual second material.

In one embodiment, the first material is a layer of material formed above a substrate. In another embodiment, the first material is a defect present in a layer of material formed above the substrate. In one embodiment, the first and second wavelengths of the laser beam are selected so as not to damage a layer positioned below the first material. In one embodiment, the amount of energy of each of the first and second wavelengths present in the laser beam is varied. In one embodiment, the substrate is a glass substrate.

DETAILED DESCRIPTION OF THE INVENTION

In laser micromachining and laser defect repair of a first material, a first set of one or more laser wavelengths is selected in accordance with the first material's absorption characteristics and is combined and delivered concurrently with a second set of one or more laser wavelengths which is selected in accordance with the absorption characteristics of a second material generated by and remaining from the ablating interaction of the first material with the first set of laser wavelengths. The concurrent presence of the second set of one or more laser wavelengths removes the residual second material.

Figure 1:
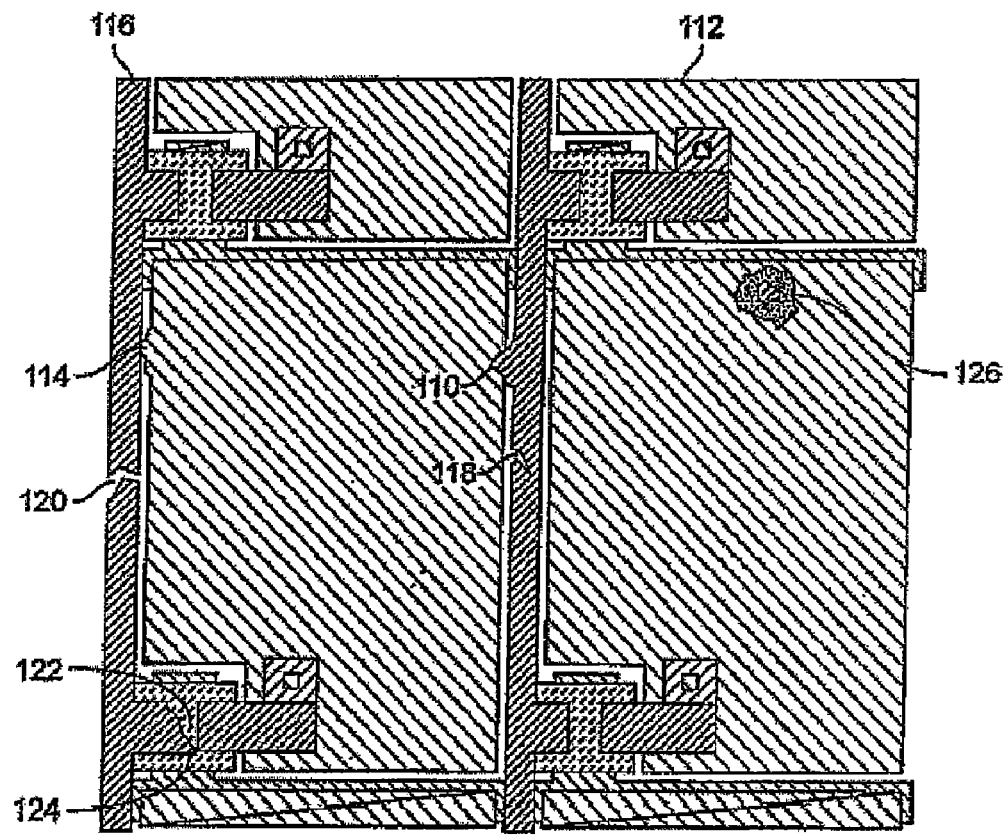
FIG. 1 shows a variety of different defects in a top view of a portion of a large flat patterned medium with transistor arrays, as known in the prior art.
Figure 2A:
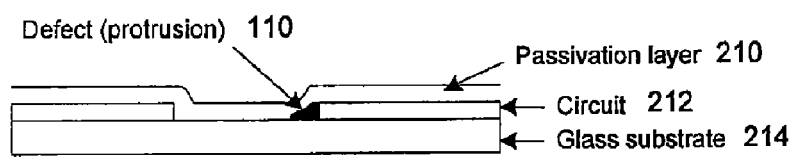
FIGS. 2A and 2B show cross sectional views of a device having a protrusion defect before and after repair, as known in the prior art.
Figure 2B:
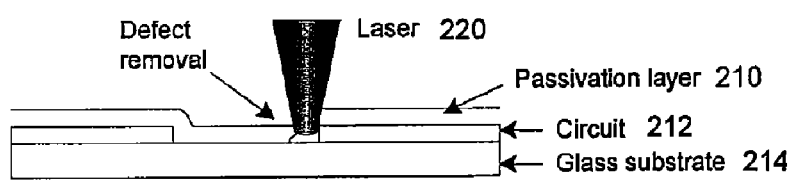
Figure 3A:
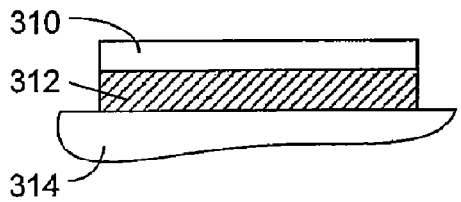
FIGS. 3A, 3B, 3C show steps for micromachining or ablation of a material in a stack and at a laser fluence that does not damage the underlayer but results in debris, as known in the prior art.
Figure 3B:
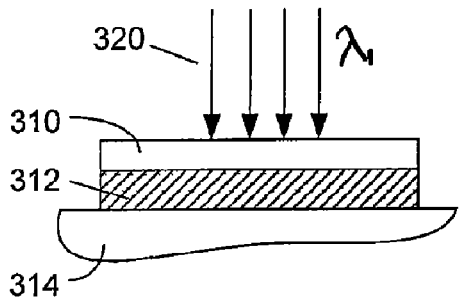
Figure 3C:
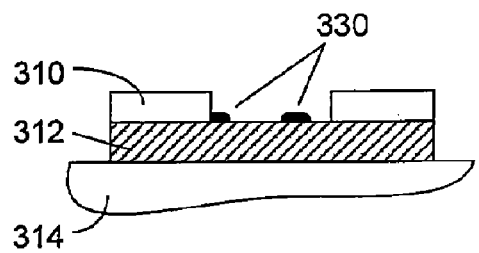
Figure 3D:
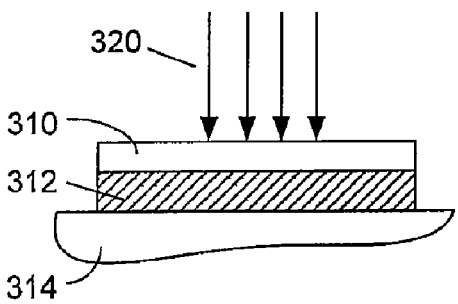
FIGS. 3D, 3E show steps for micromachining or ablation of a material in a stack and at a laser fluence that is high enough to remove debris, but is also high enough to at least partially ablate the underlying material, as known in the prior art.
Figure 3E:
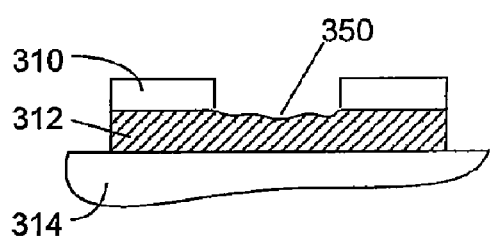
Figure 3F:
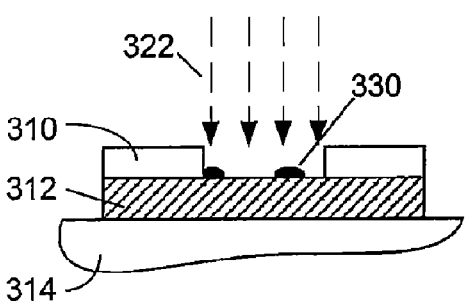
FIGS. 3F, 3G show the steps according in which a second laser having a different wavelength is applied to the debris left after completion of step 3C, as known in the prior art.
Figure 3G:
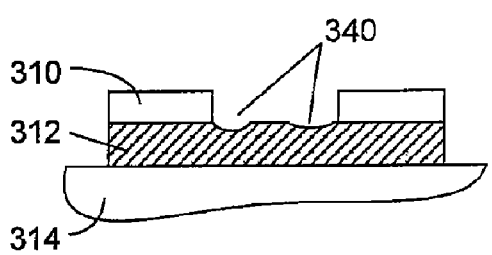
Figure 4:
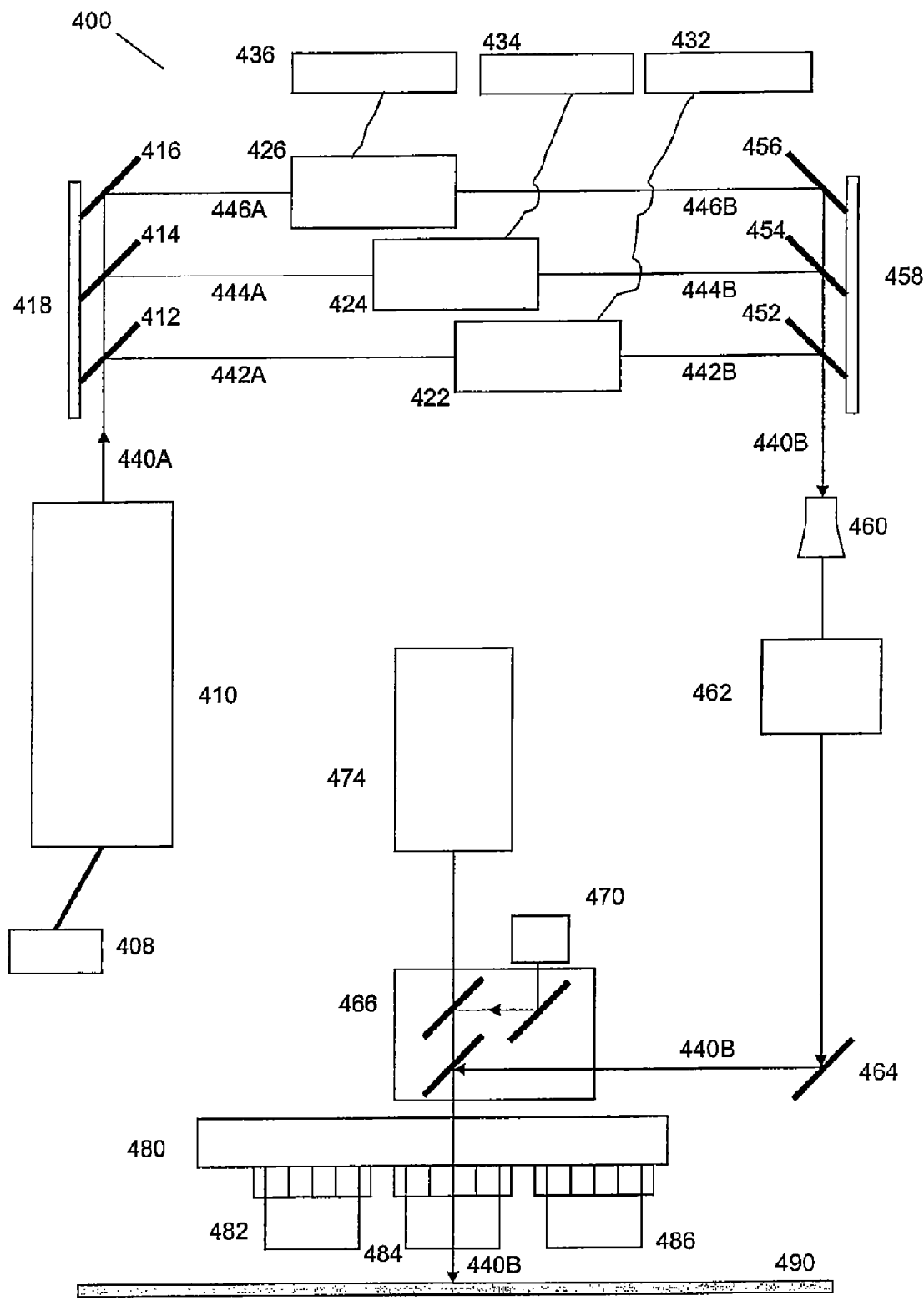
FIG. 4 is a schematic diagram of a laser optical subsystem used in a laser ablation or micromachining system, in accordance with one embodiment of the present invention.

In accordance with one embodiment of the present invention, an apparatus delivers more than one laser wavelength simultaneously to a material to be removed (target material). FIG. 4 is a schematic diagram of a laser optical subsystem 400 disposed in a laser ablation or micromachining system in accordance with one embodiment of the present invention. The laser optical subsystem 400 is shown, in part, as including a laser 410 capable of producing multiple wavelengths simultaneously, a first set of harmonic beam splitters 418 that are tuned to split the laser output into beam paths of specific wavelengths (in this example, the three laser beams, each with a different wavelength, are shown as 442A, 444A, and 446A), attenuators 422, 424, 426, associated respectively with beams 442A, 444A and 446A, and that are adapted to control the power of their respective laser beams, a second set of harmonic beam splitters 458 that direct the laser beams 442B, 444B and 446B back to a single beam path 440B that then passes through a beam expander 460 and focuses on beam defining aperture 462. Beam defining aperture 462 directs its beam to a beam combiner 466 which combines the laser beam and imaging path for a video camera 474 and its illuminator 470. The beam is then directed through an objective lens 484 toward the target material on substrate 490 to be repaired. One or more objective lenses, for example 482, 484, and 486, may be positioned in the beam path through the use of a mechanical mounting means such as a turret 480. FIG. 4 also shows the controller 408 for the laser and controllers (432, 434, 436) for each of the attenuators.

The laser controller 408 controls two or more laser wavelengths. Each attenuator (422, 424, 426) is controlled separately by way of firmware or software through controllers 432, 434, 436, respectively. All the laser beam path optics component properties such as coating, substrate material, and the like, are optimized to accommodate the full range of wavelengths that the laser may provide. FIG. 4 shows three attenuators, but it is understood that any number of attenuators may be used depending on the number of wavelengths the laser is capable of producing.

In one embodiment, laser 410 may be a Nd:YAG laser that can provide wavelengths at 1066 nm, 532 nm, 355 nm, and 266 nm. The laser may be diode pumped or flash-lamp pumped. Other lasers having multi-wavelength outputs may be used.

Figure 5:
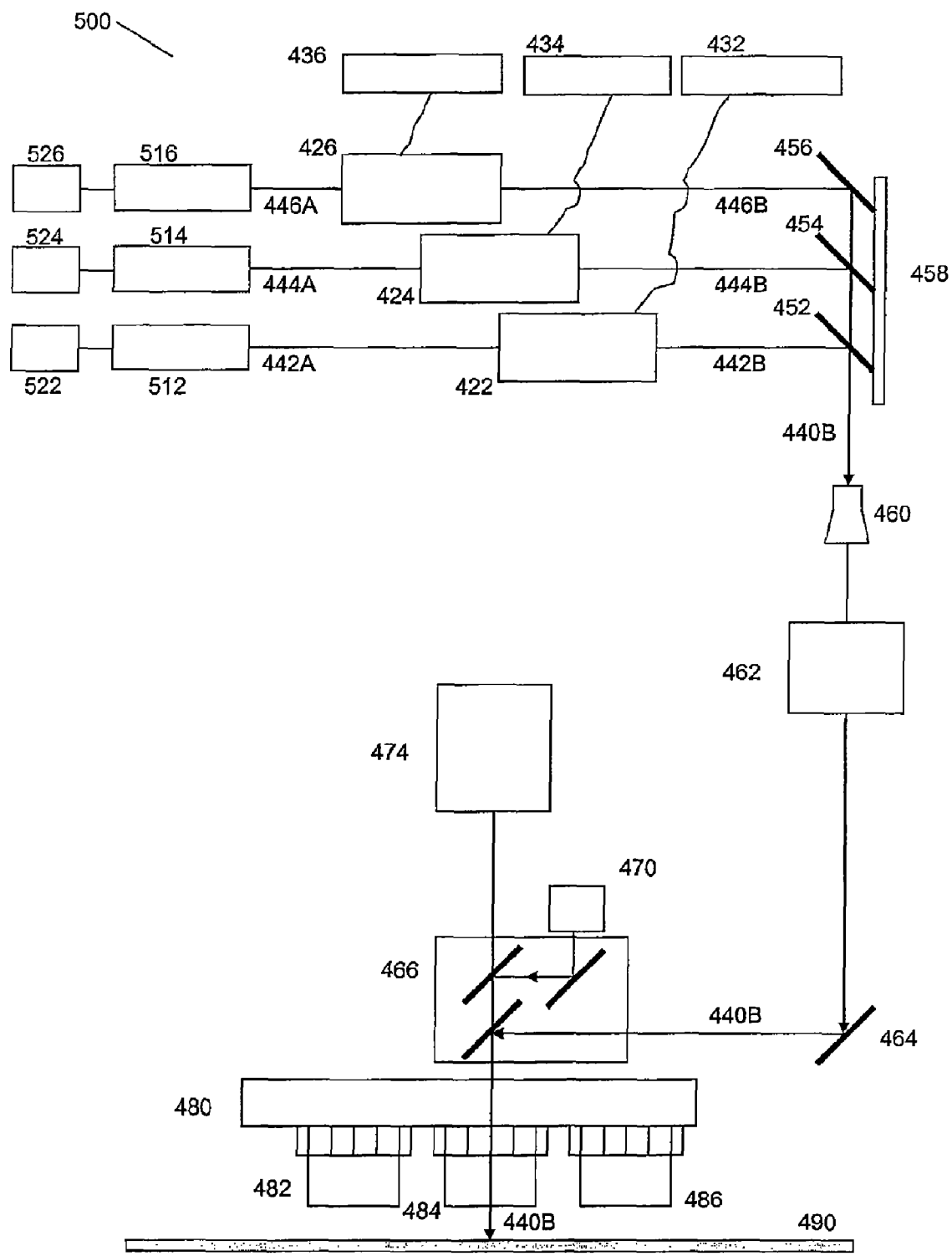
FIG. 5 is a schematic diagram of a laser optical subsystem used in a laser ablation or micromachining system, in accordance with another embodiment of the present invention.

In some embodiments, instead of a single laser 410 capable of generating multiple wavelengths as shown in FIG. 4, two or more lasers, each delivering a single but different wavelength, may be used. In the exemplary embodiment 500 shown in FIG. 5, three lasers 512, 514, 516, each delivering a single but different wavelength beam 442A, 444A, 446A are shown. Laser beams 442A, 444A and 446A are directed into the attenuators 422, 424, 426 which, in response, supply beams 442B, 444B and 46B that are combined into a single beam 440B by the set of harmonic beam splitters 458. The remaining beam delivery system of system 500 is the same as system 400 shown in FIG. 4. However, for the arrangements shown in FIGS. 4 and 5, the net result is the same: a beam 440B composed of at least two wavelengths is delivered concurrently and collinearly at the target material. The single laser arrangement of FIG. 4 has a lower cost and lower complexity than the multi-laser arrangement of FIG. 5.

A laser beam having at least one wavelength applied at the target material modifies the material, either ablating it at least in part or modifying its composition. The modified material may have absorption characteristics that are different from the original target material. In accordance with the present invention, the laser beam further includes at least a second wavelength optimized for the modified material's absorption properties. The second wavelength is absorbed by the modified material, causing ablation at least in part. The final result is a complete and clean removal of the target material. Both the first and at least second wavelengths are present in the laser beam simultaneously. In particular, certain materials used in microcircuits such as those found in flat panel displays may absorb 266 nanometer wavelength strongly while remaining transparent to the visible wavelengths, for example, 532 nanometer wavelength. Typically, metals absorb visible wavelengths well, while an organic layer absorbs deep ultraviolet (DUV) wavelengths well.

Figure 6A:
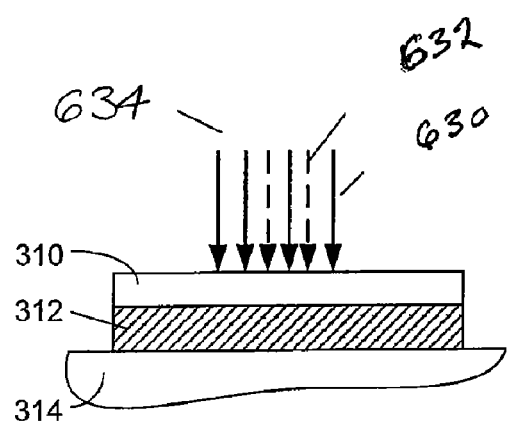
FIGS. 6A-6C show a cross-sectional view of a laser beam that includes at least two wavelengths simultaneously impinging on the target material, in accordance with one embodiment of the present invention.
Figure 6B:
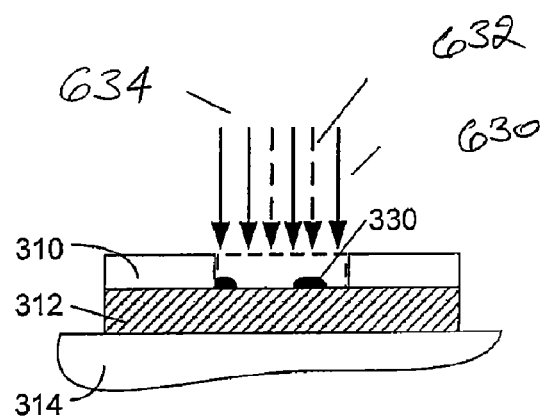
Figure 6C:
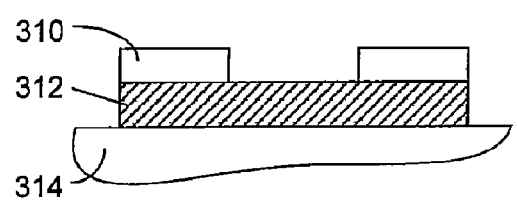

FIGS. 6A, 6B, 6C show how a material is removed in accordance with the present invention. FIG. 6A shows a layered structure requiring the machining of layer 310 without damaging underlayer 312. A laser beam 634 that includes at least two wavelengths, $\lambda 1$ and $\lambda 2$, is represented schematically in FIG. 6B as two different rays 630 (solid line) and 632 (dotted line). In this illustration, $\lambda 1$ (630), may represent an ultraviolet wavelength to which layer 310 is sensitive, while $\lambda 2$ (632) may represent a visible wavelength to which layer 310 is transparent but to which, for example, metals are particularly sensitive. As schematically illustrated in FIG. 6B, laser wavelength $\lambda 1$ (630) partially ablates material 310 resulting in modified material or debris 330 to be formed. Such debris may include layer material 310 reduced to elemental metal. The wavelength $\lambda 2$ (632) of the laser beam, which is selected to better match the absorptive properties of the elemental metal making up the debris, then ablates and cleanly removes such elemental metal or other debris formed as a result of exposing material 330 to laser wavelength $\lambda 1$ (630). FIG. 6B schematically illustrates that material 310 is transparent to the $\lambda 2$ (632) rays, but the debris 330 is not. Because laser wavelength $\lambda 2$ (632) is simultaneously present with laser wavelength $\lambda 1$ (630), wavelength $\lambda 2$ removes any debris that is generated as a result of modifying material 330 by exposing it to laser wavelength $\lambda 1$ (630). FIG. 6C shows that after applying multi-wavelength beam 634, no debris is left.

An example of an application of this invention can be found in the fabrication and repair of flat panel display (FPD) arrays. Specifically, a common repair in FPD processing requires the removal of a portion of an ITO (indium tin oxide) layer on a liquid crystal display (LCD) panel substrate without damaging the metal layer underneath. Using a Nd:YAG laser as the source, the wavelength best matched for ITO removal is the ultraviolet (UV) wavelength (266 nm). If the process is not tightly controlled (laser energy, dwell time, spot size, etc.), an excessive amount of debris may be generated. In particular, the debris may include a mixture of materials that derive from the ITO composite when ablated by the laser beam. The absorption properties of the debris of this mixture of materials may therefore be significantly different from the original ITO. Further, because the materials may be reduced fully or partially to elemental metals, they may tend to strongly absorb visible wavelengths rather than the originally applied UV wavelength.

Consequently, to remove such debris, in accordance with the present invention, visible (532 nm wavelength) laser energy is combined with UV (266 nm wavelength) laser energy. The combination of these two wavelengths of laser energy is delivered simultaneously to enable complete removal of the ITO material without damaging the underlying metal. In particular, the ITO layer is sensitive to the UV wavelength and is ablated or removed at least partially while the underlying metal layer is transparent to UV and is not damaged nor substantially heated. The simultaneous presence of visible laser energy with the UV laser energy is sufficient to complete the ablation of the already heated debris, which includes ITO reduced either to fully or partially elemental metal state, and therefore sensitive to the visible wavelength. Because the debris is at an elevated temperature, a relatively small amount of visible laser energy is required to be combined or mixed with the UV laser energy. The amount of visible laser energy is less than the UV laser energy and is adjusted so as not to cause damage to the underlayer. Experiments have shown a successful removal of debris without damage to the underlayer using a laser beam composed of UV and visible wavelengths, and with visible laser energy at approximately 20 to 45% of the total.

Using the two wavelengths separately, as is done conventionally, has been shown as being less effective. In particular, experiments indicate that if a 266 nm laser wavelength is applied first followed by a 532 nm wavelength which should be readily absorbed by the debris material, the amount of 532 nm energy, applied in a second step that is required to remove the debris, will damage the metal layer. In contrast to conventional techniques, in accordance with the present invention, the two (or more) wavelengths are simultaneously applied thus allowing the absorption of the debris material while the material is still at an elevated temperature, and enabling removal with only a small amount of energy of the second wavelength.

The above description is provided with reference to micromachining or removing a portion of a layer of a first material. It is understood, however, that the present invention is equally applicable to removal of a first material that may be in the form of a defect that lies embedded within or on top of a layer of a different material, having a different response to laser energies due to its different optical properties. Further, the defect may be an impurity embedded in a stack of different materials formed above a substrate.

The above embodiments of the present invention are illustrative and not limiting. Various alternatives and equivalents are possible. The invention is not limited by the type of laser or the number of wavelengths present in the laser beam. The invention is not limited by the number or the type of defects that may be removed. Nor is the invention limited by the material in which the defect is present. Other additions, subtractions or modifications are obvious in view of the present disclosure and are intended to fall within the scope of the appended claims.

What is claimed is:

1. A method of micromachining/repairing a first material present over a substrate, the method comprising:

generating a laser beam, said laser beam comprising at least a first laser wavelength and at least a second laser wavelength concurrently present therein, said at least first wavelength being different than said at least second laser wavelength; and directing the laser beam to the first material, said at least first laser wavelength being selected in accordance with an absorption characteristic of the first material to cause an ablation interaction of the first material with the at least first laser wavelength, said at least second laser wavelength being selected in accordance with an absorption characteristic of a second material generated by and remaining from the ablation interaction of the first material with the at least first laser wavelength, said at least second laser wavelength thereby causing a removal of the second material.

2. The method of claim 1 wherein said first material is a layer of material formed above the substrate.

3. The method of claim 1 wherein said first material is a defect present in a layer of material formed above the substrate.

4. The method of claim 1 wherein said first and second wavelengths of the laser beam are selected so as not to damage a layer positioned below the first material.

5. The method of claim 1 further comprising:

varying an amount of energy of each of the at least first and second wavelengths present in the laser beam.

6. The method of claim 1 wherein said substrate is a glass substrate.

* * * * *